(12) United States Patent
Huang et al.

(10) Patent No.: US 9,922,086 B1
(45) Date of Patent: Mar. 20, 2018

(54) CONSISTENT QUERY OF LOCAL INDEXES

(71) Applicant: Amazon Technologies, Inc., Seattle, WA (US)

(72) Inventors: Xianglong Huang, Bellevue, WA (US); David Alan Lutz, Renton, WA (US); Wei Xiao, Kirkland, WA (US); Maximiliano Maccanti, Bellevue, WA (US); Somasundaram Perianayagam, Seattle, WA (US); Rande A. Blackman, Seattle, WA (US); Stuart Henry Seelye Marshall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/400,175

(22) Filed: Jan. 6, 2017

(51) Int. Cl.
*G06F 17/30* (2006.01)

(52) U.S. Cl.
CPC .. *G06F 17/30451* (2013.01); *G06F 17/30312* (2013.01)

(58) Field of Classification Search
CPC ............... G06F 17/30451; G06F 17/30312
USPC .......................................... 707/717
See application file for complete search history.

(56) References Cited

U.S. PATENT DOCUMENTS

2004/0260684 A1* 12/2004 Agrawal ........... G06F 17/30312
2012/0254143 A1* 10/2012 Varma ............... G06F 17/30401
707/706

OTHER PUBLICATIONS

Feng, Chen, et al., "CCIndex for Cassandra: A Novel Scheme for Multi-dimensional Range Queries in Cassandra", SKG 2011, Beijing, China, Oct. 24-26, 2011, pp. 130-136.*
Kules, Bill, et al., "From Keyword Search to Exploration: How Result Visualization Aids Recovery on the Web", Univ. of MD, Human Computer Interaction Lab, HCIL-Jun. 2008, College Park, MD, Feb. 2008, 57 pages.*

* cited by examiner

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

A distributed database management system may comprise a plurality of computing nodes. A request to update an item maintained by the system may be acknowledged as durable and committed once an entry corresponding to the request has been written to a log file and quorum among the computing nodes has been achieved. Improved consistency may be achieved by maintaining snapshots of committed item states within queryable in-memory snapshot data structures. Range queries may be performed by merging a secondary index with the snapshots and applying filters. Projections may be completed by retrieving additional data from an item collection maintain on one or more storage devices.

20 Claims, 10 Drawing Sheets

CONSISTENT QUERY OF LOCAL INDEXES

CROSS REFERENCE TO RELATED APPLICATIONS

This application is a continuation of U.S. patent application Ser. No. 13/865,113 filed on Apr. 17, 2013, the entire contents of which are incorporated herein by reference.

BACKGROUND

Updates to data maintained by a distributed database management system ("DBMS") may be subject to a delay between the time the request to update data is received and the time the update has been fully processed. A distributed DBMS may comprise a collection of items that can be both distributed and replicated across a number of computing nodes. On each computing node, a subset of the item collection as well as various index structures may be maintained on one or more storage devices. Processing an update may involve communication between the computing nodes as well as various high-latency write operations on the storage devices. These factors may contribute to the delay in processing an update.

The delay in processing updates may contribute to data consistency issues. One such issue involves clients being unable to read their own updates. A client may submit a request to change an item of data to a distributed DBMS. Immediately or soon thereafter, the client may issue a request to read the same item. Depending upon the amount of delay, the computing node processing the request and the time the computing node receives the read request, the results may be consistent or inconsistent with the client's most recent update.

BRIEF DESCRIPTION OF DRAWINGS

The drawings provided herein are designed to illustrate example embodiments and are not intended to limit the scope of the disclosure.

DETAILED DESCRIPTION

Figure 1A:
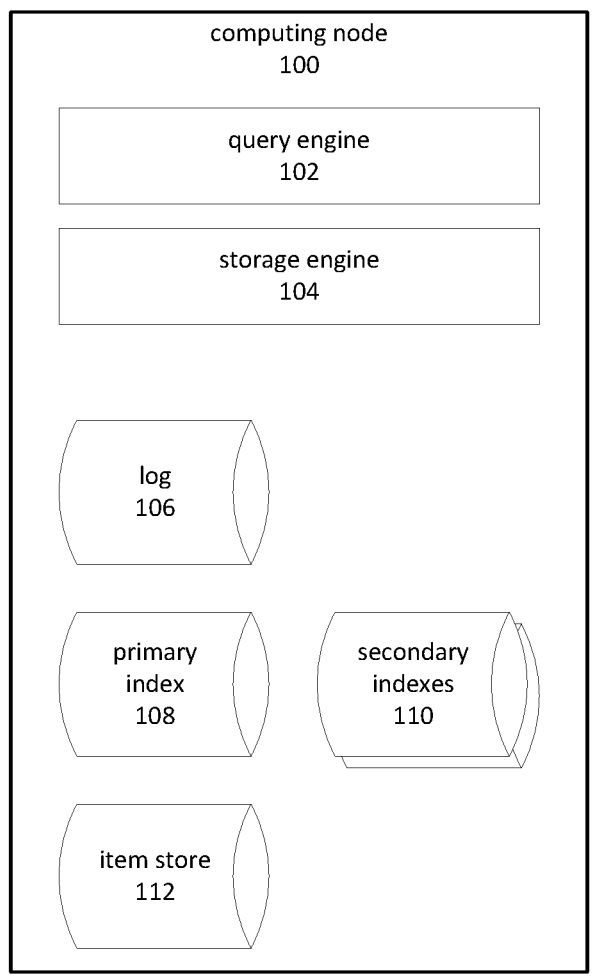
FIG. 1A is a block diagram depicting a computing node configured as a component of a database management system.

A distributed DBMS can be described as maintaining a collection of tables. Each table may contain a set of items, where each item comprises a set of values and is associated with a primary key. Examples of distributed DBMSs include key-value database, No Structured Query Language ("NoSQL") databases, object-oriented databases and so forth.

Each value within an item may also be associated with a name. In other words, an item may be considered to be a collection of name value pairs. Distributed databases may not necessarily enforce any particular schema, but in practice each item in a table may have values identified by the same name. For convenience, these may be called columns.

The items may be accessed by the use of operations in which the primary key may be supplied as a parameter. Within the database management system, the requested item or items may be located by the use of one or more primary key indexes, which may for example comprise data structures mapping between primary keys and the storage locations of associated items. Various structures may be utilized in conjunction with a primary key index. In some embodiments of a distributed DBMS, a primary key index structure on each computing node may contain entries for all items stored by the distributed DBMS. In other embodiments, the each computing node may maintain a primary key index for items stored on that computing node. One or more additional structures may be employed to locate the appropriate index.

A distributed database may support a wide variety of operations. Non-limiting examples include the following operations. A put operation may be described as an operation for either adding a new item to the system or modifying an existing item. A read or get request may be described as an operation for retrieving one or more items. A read or get request may specify primary keys for the items to be retrieved, and may also specify a projection, which involves a definition of the set of values that should be returned for each item. The specification of a projection may comprise a list of columns or names corresponding to the values that should be returned. A projection may therefore be seen as defining a view of the item.

Another type of operation that may be supported is a range query, which involves returning a set of items falling within a particular range of values. In a key-value database, a range query may comprise identifying one or more values that should be held constant over the query.

Embodiments may utilize primary keys of various forms. A primary key may be composed of a single value or may be a composite of more than one value. A composite primary key may be composed of two or more values that as a group uniquely identify the corresponding item. Embodiments may also employ composite primary keys comprising at least a hash key and range key that reflects or defines hierarchical relationships within the data. Within the hierarchy, a hash key identifies a group of items, while a range key identifies specific items within the group.

In addition to a primary index, data may also be accessible through one or more secondary indexes. In a key-value database, a secondary index comprises one or more data structures are addressable by a potentially non-unique key value. Unlike primary key values, secondary key values are not necessarily unique. In other words, a single secondary key value may refer to one or more entries in a secondary index.

For a given item, a secondary index key may comprise one or more of the values that make up the item. In various embodiments, the secondary index might also contain a mapping from its entries, which are accessible by secondary key values, to the storage location of the item. However, in some embodiments this mapping might be omitted. The secondary index entries might contain a copy of the primary key value, or a direct reference to the primary index, that may be used to retrieve a full item from an item store. An item store, which may also be referred to as a base table, comprises a collection of items maintained on a storage device. The items stored in an item store may comprise all of the values, or name value pairs, associated with the item. Data in an item store may be horizontally or vertically partitioned, and if so subsets of an item store may reside on more than one computing node.

A secondary index may also be a queryable data structure. Embodiments may support range queries of a secondary index based on a portion of a composite secondary key. For example, a secondary index key might comprise a zip code and a last name. The secondary index might then be searchable to access a list of all last names within a given zip code.

A local secondary index may be described as a class of secondary index in which all of the items maintained by the index are local to a computing node associated with the local secondary index. Various operations may be performed on collections of items located on the same machine that might be inefficient if performed across multiple computing nodes. Unless otherwise noted, as used herein the term secondary index encompasses a local secondary index.

The items, schema and other data related to the table may be distributed across one or more of the computing nodes that comprise the database management system using at least two forms of distribution. A first form of distribution involves partitioning the table based on various attributes of the primary keys or items. For example, items whose primary keys begin with the letters 'A' through 'M' might be stored on one computing node, while items whose primary keys begin with the letters 'N' through 'Z' might be stored on another. Many other variants are possible. In an embodiment, a hash of the primary key may be used, directly or indirectly, to determine which computing node the item will be stored on. Embodiments may use an indirection mechanism, such as using a hash of the primary key to refer to an indirection value which itself refers to a computing node.

A second form of distribution involves replicating data between two or more computing nodes. This approach may improve the availability of the system, because if one of the computing nodes becomes unavailable a second computing node with the same set of replicated data may be able to step in and take its place. The approach may also improve scalability of access to the data, because load may be shared among the replicated nodes. As with table partitioning, the computing nodes selected to contain replicated data may be based on various attributes of the data such as a hash of the primary key. In an embodiment, a given hash key may be considered to have neighboring values within the hash key space; these neighbors may house the replicated data. Numerous other approaches are possible.

Consistency between replicated data may be maintained using a technique that involves quorum or consensus between computing nodes that store the replicated data. In various embodiments, quorum may be required only among currently active computing nodes, which may improve availability because it does not require all of the computing nodes to be online.

In some embodiments, quorum may involve determining that a minimum number of computing nodes participate in a read or write operation. For read operations, at least the minimum number of computing nodes must respond to a request to read an item. Because data is not necessarily replicated immediately, it may be the case that two given computing nodes will have different values for the same item. If so, some embodiments may return each version of the data, along with information descriptive of the version. For write operations, quorum may involve the minimum number of computing nodes acknowledging the success of a write operation. For example, if three computing nodes share replicated data, a write operation might be required of two of the three computing nodes. Embodiments may impose different quorum requirements based on the type of operation involved. For example, write operations may involve a higher threshold number of computing nodes in order to achieve quorum.

FIG. 1A depicts the architecture of a computing node in a distributed database management system. The system may comprise one or more computing nodes, such as computing node 100, on which a combination of software and hardware comprises a local DBMS. Software components such as query engine 102 and storage engine 104 may process incoming requests, such as put and read requests, which may in turn require interaction with one or more structures maintained on various storage devices. Log 106, primary index 108, secondary index 110, and item store 112 may be stored on one or more storage devices. The storage devices may comprise any type of storage device, such as magnetic disk storage, solid-state drives, storage area networks and so forth. Log 106 may be configured to optimize performance for appending log entries. Primary index 108 and secondary indexes 110 may comprise any number of structures designed primarily as "on-disk" storage, meaning that a significant portion of the data structure resides on the storage device rather than in the computing node's random access memory. One non-limiting example of a structure for the primary and secondary indexes is a B-tree. The primary and secondary indexes may all employ different combinations of data structures.

Figure 1B:
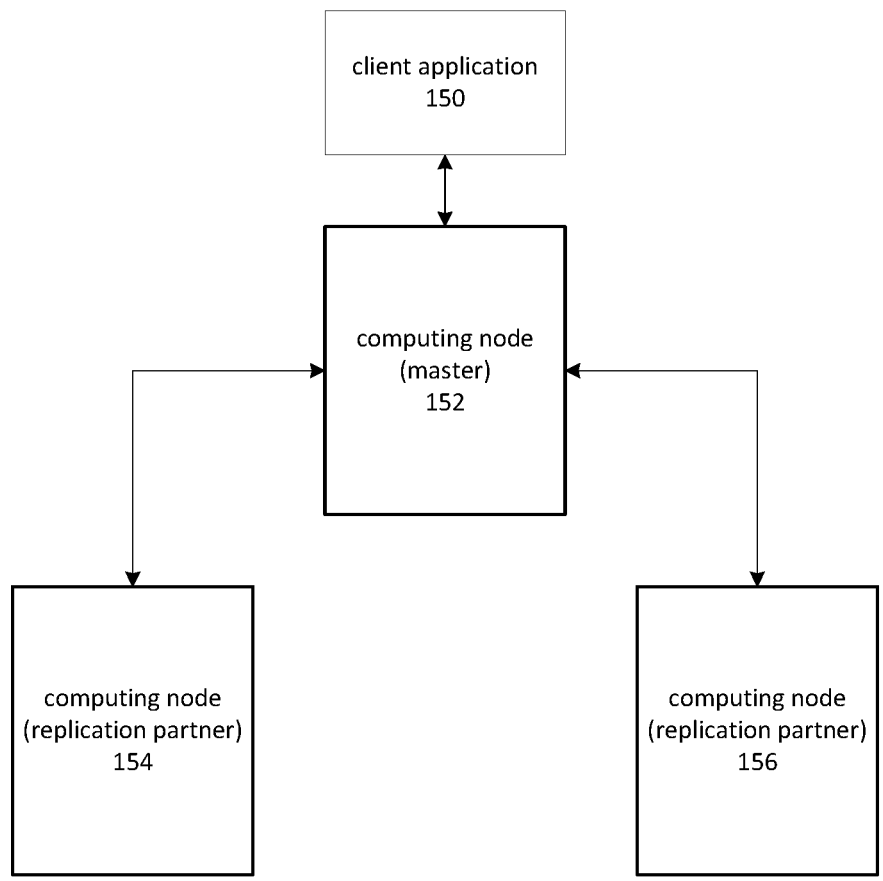
FIG. 1B is a block diagram depicting one example of a distributed DBMS comprised of three computing nodes.

FIG. 1B depicts a view of a distributed DBMS interacting with a client application 150. Computing nodes 152, 154 and 156 comprise a distributed DBMS. The depicted architecture is illustrative of a system that employs distributed data utilizing a quorum system. For clarity, no horizontal table partitions are depicted but may be employed by various embodiments.

Embodiments may permit client application 150 to interact with any computing node in the system, but for clarity client application 150 is depicted as interacting only with computing node 152. The interaction may comprise issuing requests to store and retrieve data through operations such as put and get. Client application 150 may also issue queries of various types, including queries over a range of items limited by criteria such as secondary index values. Criteria may also include filters, comparison operators and the like. Computing node 152, as the computing node that interacts with client application 150 for the purpose of processing these requests, may be described as the master computing node, which may orchestrate the involvement of the other two computing nodes for the purposes of obtaining quorum.

Figure 2:
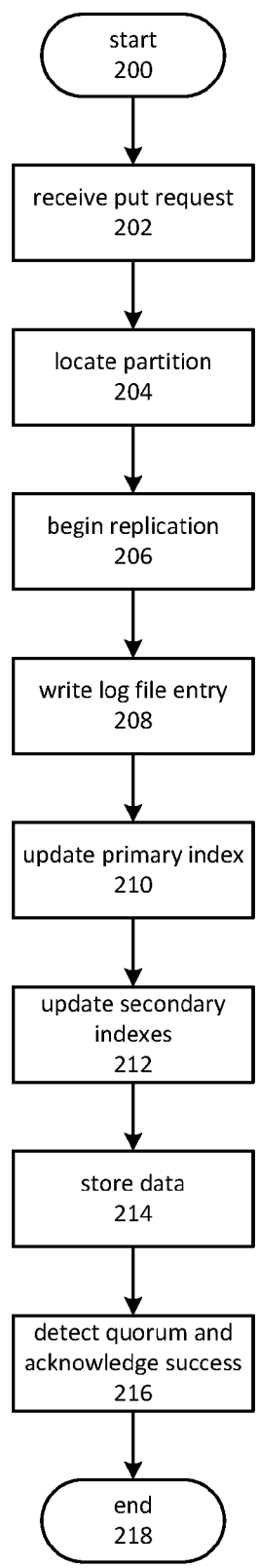
FIG. 2 is a flowchart depicting a process for processing a request to perform a put operation to store data in a distributed DBMS.

FIG. 2 depicts an embodiment for adding data to a key-value DBMS. Although depicted as a sequence of operations beginning with operation 200 and ending with operation 218, those of ordinary skill in the art will appreciate that the depicted operations are intended to be illustrative and that some of the depicted operations may be altered, omitted, reordered or performed in parallel.

Adding or modifying an item in a key-value DBMS may be initiated by receiving a request to perform a put operation as depicted by operation 202. The request may comprise one or more values corresponding to an item, and a primary key value identifying the item to be added or modified. The request may also contain names associated with the values in the item, so that the request constitutes a primary key and a collection of name-value pairs.

Operation 204 depicts locating a partition corresponding to a primary key value supplied in the put request. If the table is partitioned, data may be divided between two or more computing nodes based on characteristics of the primary key. Embodiments may partition the primary key into two or more portions and use a hash function applied to one of the portions to determine an applicable partition. Various techniques for allow indirection may also be employed.

The computing node corresponding to the partition may continue to process the put request, for example by performing depicting operation 208. However, if the embodiment also distributes data through replication, additional computing nodes may also participate in the put request. Operation 206 depicts beginning the replication process, which may involve locating one or more additional computing nodes on which the corresponding data is or could be stored. These computing nodes may also perform operations such as writing a log file entry 208, updating secondary indexes 212 and so forth.

A factor contributing to durability of the put request is writing a record of the request to a log file, as depicted by operation 208. The entry may therefore be performed at an early stage of processing the put request. If a system crash or other problem were to prevent the put request from being fully performed, an entry corresponding to the request may have been written to the log file. Upon recovering from a crash, embodiments may replay those entries in the log file that were not successfully processed.

Operation 210 involves updating the primary index to reflect the new or modified data. If the item is new, an entry corresponding to the primary key supplied by the put request is added to the primary index. If the item already exists, an entry corresponding to the primary key may be updated for various purposes, such as reflecting changes to the value of the primary key or a change in the storage location of the item corresponding to the primary key.

At operation 212, one or more secondary indexes may be updated to reflect the item being inserted or modified by processing the put request. If the item is new, any secondary indexes which apply to fields contained in the new item may be updated to reflect the new entry. If the item already exists, any secondary indexes involving fields that have changed may be modified to reflect the changes. The secondary indexes may also be updated for other reasons, for example to reflect a change to the storage location of an item.

Operation 214 involves storing the new or updated item at a location referred to be the primary and secondary indexes. If the item is new, data corresponding to the new item may be written to a storage device. If the item already exists, data on the storage device corresponding to the item may be modified to reflect the changes.

Embodiments may perform operations 210, 212 and 214 while in the context of an atomic transaction. Doing so may help to prevent system corruption that might otherwise be caused by a system failure in the midst of these operations. For example, if these operations are not performed atomically, the primary index might be updated to reflect a new item but the item itself might not be stored on the storage device.

In embodiments distributing data by replication, the presence of quorum may be detected at operation 216. This may, for example, involve determining that a majority of computing nodes involved in storing replicated data have participated in the write transaction. In some embodiments, only a majority of currently operating nodes may be needed for quorum. When quorum is detected, the success of the write operation may be acknowledged. Embodiments may also specify a threshold level of computing nodes for quorum, which need not be a majority. If the embodiment does not involve replicated data, the success of the write operation may be acknowledged once operations 210, 212, and 214 have successfully completed.

The operations depicted in FIG. 2 are illustrative of a put operation, which may for example involve adding new items to the database or modifying existing items. However, the general principles depicted by FIG. 2 may be applied to various other operations performable on the DBMS. For example, removing an item from the DBMS may involve a similar set of operations.

Changes to the primary and secondary indexes, and to the items stored on disk, may involve an undesirable degree of latency, or in other words time that elapses between receiving a request and sending acknowledgement of completion. A variety of factors may contribute to latency, such as the speed of the storage devices on which the primary and secondary indexes are stored. Where data is replicated and quorum is required, the latency of an operation may depend on the speed of the slowest storage devices among the computing nodes maintaining the replicated data, because successful completion may not be acknowledged until the slowest computing node has completed its participation in the operation.

Updates to the primary and secondary indexes may result in consistency problems. In general terms, consistency refers to one of the atomicity, consistency, isolation, and durability ("ACID") properties associated with theoretical idealized DBMSs. Consistency may also refer to the behavior of a DBMS under at least two conditions. The first involves put requests that are immediately followed by a read or query request pertaining to the same item. After a put request has been received but before it has been fully processed, a period of time may elapse before the updates to the primary index, secondary indexes and item store have been committed. If a read operation is performed prior to the commit, old rather than new values will be returned. This may occur even when the same client issued both the put request and the subsequent read request.

A second DBMS behavior related to consistency involves partial-updates. If updates to the primary index, secondary indexes and item store are not performed in the context of an atomic transaction, a read request performed during the updating may return inconsistent results. For example, consider a case where a value used as a secondary index key is changed. This might involve removing a current secondary index entry having the old value, and adding a new entry having the new value. A range query over the secondary index might return zero items, one item or two items depending on the time the read request was processed and the order in which the index entries were added and deleted. Similarly, a read operation hoping to retrieve an item by finding an entry in the secondary index corresponding to the value might retrieve zero items or one item, depending on when the request was processed relative to the order of adding and deleting the index entries.

Figure 3:
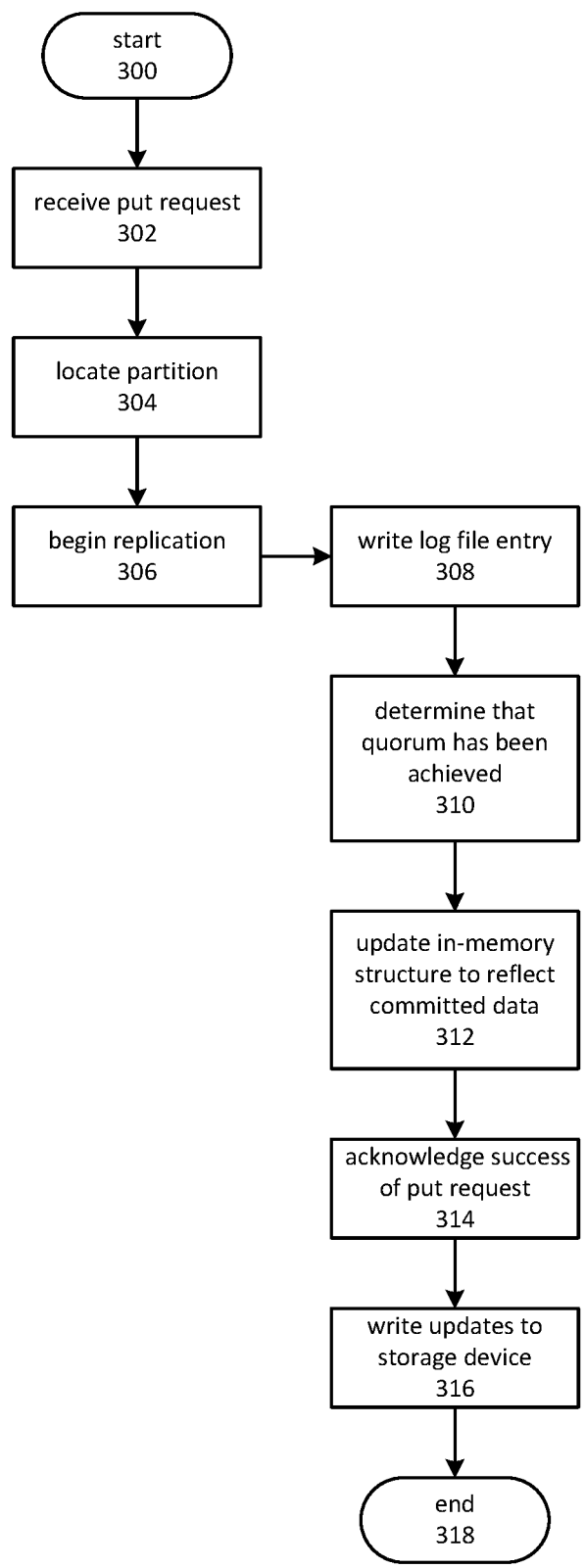
FIG. 3 is a flowchart depicting an embodiment for processing a request to perform a put operation that acknowledges the request as committed upon updating an in-memory snapshot data structure and before propagating corresponding changes to one or more storage devices.

One approach to addressing the aforementioned issues is depicted by FIG. 3, which depicts a sequence of operations beginning at 300 and ending at 318. Operation 302 depicts a DBMS receiving a put request. At operation 304, if the table is partitioned, the applicable partition is located as described herein. Operation 306 involves contacting additional computing nodes on which the partition's data has been replicated, and securing their participation in the processing of the put request. The additional computing nodes may participate by performing operations similar to 308, 310 and 314.

Write operations to log files typically have low latency as compared to updates to the primary index, secondary indexes and item stores. Entries in the log file may be appended to the end of the file, which avoids a number of potentially inefficient operations that may be involved with writes to positions within a file. Additions to the log file may also involve few if any locks, thus avoiding contention issues.

Operation 308 depicts writing a record of the put request to a log file. After the entry has been written, the operation may be considered to be at least locally durable. Operations may be considered durable if the effects of the operation can be reapplied at a later time, regardless of any intervening system failures.

If the data is replicated and quorum is used, the operation may not yet be globally durable because the corresponding log writes may not have been performed on the additional computing nodes involved in the put operation. However, if quorum has been achieved the update can be considered durable. Furthermore, embodiments may treat achievement of quorum to be a sufficient basis for treating the update as committed. In other words, once quorum has been achieved, the success of the put operation may be acknowledged. However, if the primary index, secondary indexes and item store have not also been updated there may be consistency problems such as those described herein.

Operation 310 depicts determining that quorum has been achieved. The put operation may thereafter be treated as committed. However, prior to acknowledging success of the put operation, various in-memory data structures may be updated to reflect changes to the item or items modified by the put request, as depicted by operation 312. The data structures may comprise an in-memory snapshot of at least a portion of the item in its committed state, and furthermore may be integrated into the processing of DBMS operations until the storage devices containing the primary index, secondary indexes and item store have been updated. The in-memory portion of a snapshot may correspond to a portion of the item in a secondary index or in an item store, but in a pre-commit state. For example, a snapshot may contain a committed value for a given column, while an item store may have, for the same item, a different pre-commit value for the same column.

Operation 314 depicts acknowledging success of the put operation prior to operation 316, which involves writing updates corresponding to the put request to one or more storage devices containing the primary index, secondary index and item store. During the interim period between operation 312 and the completion of operation 316, the in-memory data structures may be used to provide consistent query results.

Figure 4:
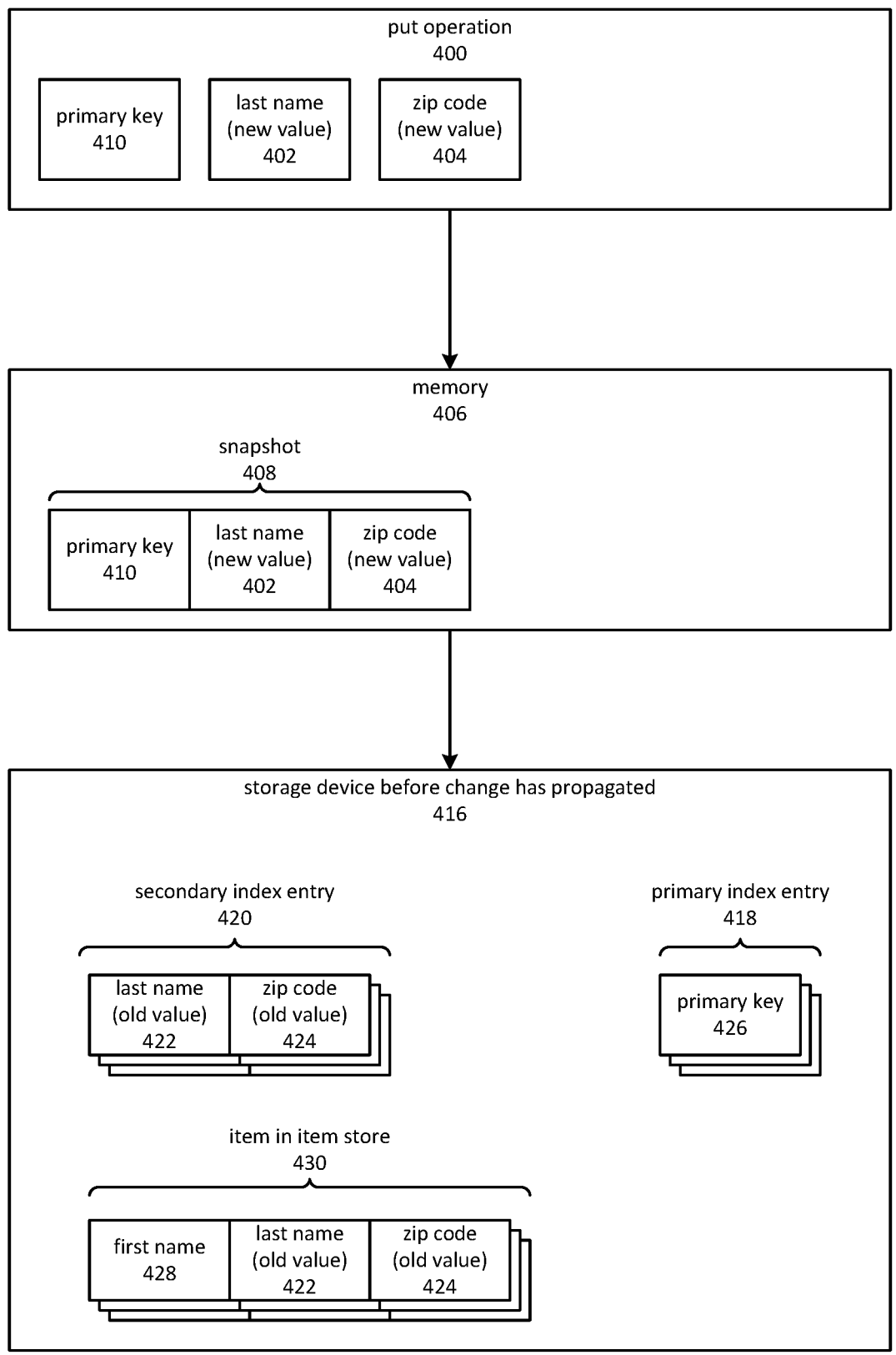
FIG. 4 is a block diagram depicting an embodiment for processing a request to perform a put operation and propagating corresponding changes to one or more storage devices.

FIG. 4 depicts aspects of an embodiment for processing put operation 400, which may comprise a primary key 410 of an item to be modified, and new values for the item such as last name 402 and zip code 404. After receiving put request 400, a DBMS may begin processing the operation using techniques disclosed herein, such as those depicted by FIG. 3. The request may be logged by computing nodes participating in the transaction, quorum detected, and the request acknowledged as committed after snapshot 408 has been created.

Snapshot 408 comprises fields containing values from committed put operation that has not yet been written to secondary index 420 or item store 430. The example depicted by FIG. 4 assumes that the put operation changed last name 402 and zip code 404 values for an item corresponding to primary key 426. Accordingly, snapshot 402 may be constructed to contain these two values and may also include primary key 426. Although not depicted explicitly in FIG. 4, embodiments may employ various techniques and mechanisms to locate the in-memory snapshot for use in subsequent operations, including subsequent put operations. Embodiments may use a hash table, linked list or other structure allowing for the snapshot to be located based on the primary key, or on one or more values combined to form a secondary key. These structures may also be maintained in memory 406.

An item stored in an item store, such as item 430, may contain a number of values while put operation 400 may reference only a subset of those values. Accordingly, snapshot 408 may contain only those values affected by or otherwise needed for the database operation being processed. However, some embodiments may include additional values in the snapshot. For example, it may be that processing an operation involves retrieving values for item 430 from an item store. If so, the retrieved values may be opportunistically included in snapshot 402. This approach may improve efficiency in some cases because the in-memory snapshot may operate as a cache, in addition to serving its other purposes.

While snapshot 408 may reside in memory 406, primary index entry 418, secondary index entry 420 and the item store in an item store 430 are on storage device 416. Storage device 416 may have reduced latency characteristics compared to memory 406. As noted previously, there may be a delay in propagating committed changes to the structures on storage device 416. Accordingly, FIG. 4 depicts last name 422 and zip code 424 as containing old values that are inconsistent with the newly committed values, last name 402 and zip code 404.

The changes reflected in snapshot 406 may be propagated over time to the structures on storage device 416, and therefore last name 422 and zip code 424 will eventually reflect the new values. In the interim period, the DBMS may provide consistency for operations that rely on the committed data by employing in-memory snapshot 408. Some operations may not rely on the committed data, or may need data from a state prior to the commit. These may rely on the structures on storage device 430.

Figure 5:
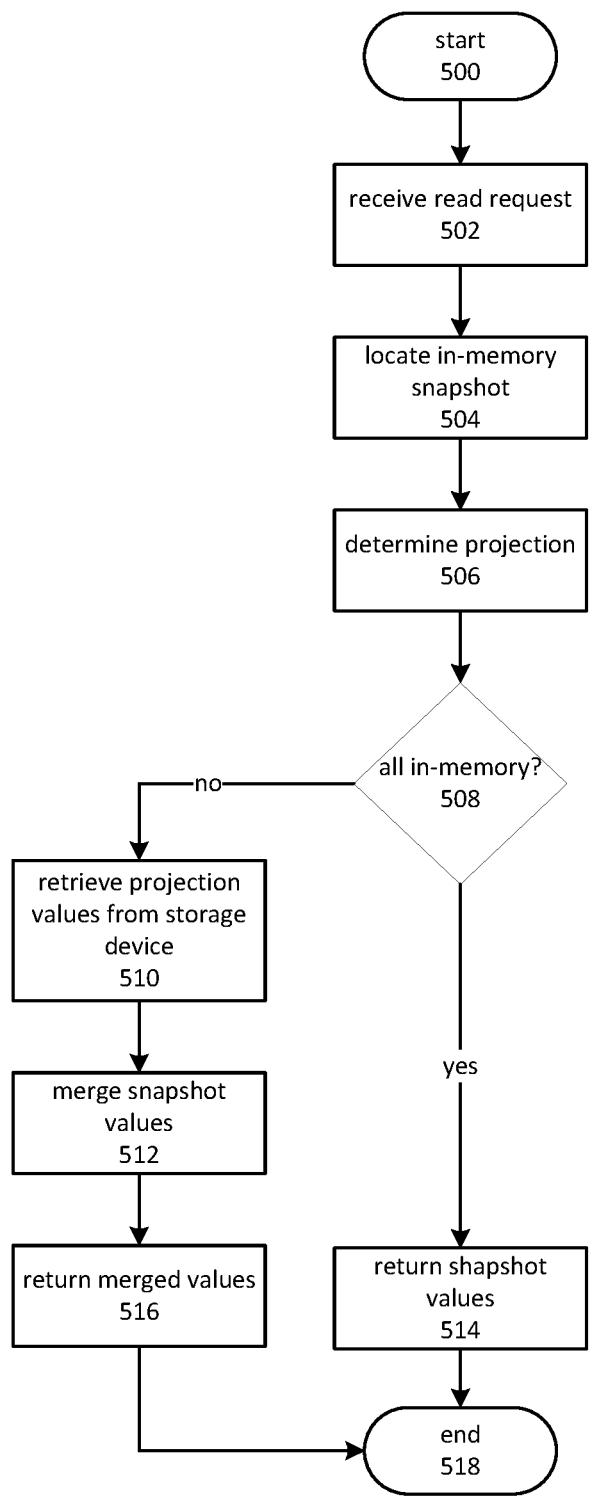
FIG. 5 is a flowchart depicting an embodiment for processing a request to perform a read operation for an item with committed updates not yet written to one or more storage devices.

FIG. 5 is a flowchart depicting an embodiment for performing a read operation using an in-memory snapshot, using a sequence of operations beginning with operation 500 and ending with operation 518. Those of ordinary skill in the art will appreciate that the depicted operations may be altered, omitted, reordered, or performed in parallel.

A request to perform a read operation may be received at operation 502. For illustrative purposes, the read request is assumed to be occurring prior to storage device updates corresponding to the previously issued put request. The read request is further assumed to be a request to access a single item which has been previously modified by a put request. However, aspects of the embodiment depicted by FIG. 5 may be utilized in conjunction with database operations that involve multiple items, such as range queries.

At operation 504, the request to perform a read operation may be analyzed to locate the item to which the read operation applies. Two stages may be involved. The first may comprise extracting or inferring values indicative of the item from the request. For example, the request might specify a primary key corresponding to the item, or it may include one or more secondary key values corresponding to a secondary index. The second state may involve employing an in-memory data structure to search for a data structure comprising an in-memory snapshot corresponding to the item. Embodiments may employ in-memory data structures such as hash tables, linked lists, graphs, concurrent skip lists and so forth.

Determining a projection, depicted as operation 506, comprises determining what subset of the corresponding item's values are needed to form a view of the item that satisfies the requested read operation. For example, the read request might comprise a call to an application programming interface ("API") that includes a list of schema indications that identify the values to be returned. In some cases or embodiments, all of the values corresponding to an item may be part of the projection.

As noted previously, the previous put operation may have involved only a subset of the item's values, and accordingly the in-memory snapshot may not contain all of the values needed to complete the projection indicated by the read operation. Operation 508 depicts determining that the contents of the in-memory snapshot are sufficient. If all of the values indicated by the projection are in-memory, a complete view of the item may be constructed using the snapshot values and returned as depicted by operation 514. However, if all of the projection values are not in the snapshot, additional values may be retrieved from data maintained on the storage device, as depicted by operation 510. These may be merged with the values contained in the snapshot, as depicted by operation 512, and returned as depicted by operation 516.

Embodiments may perform merge operation 512 by combining values contained in the in-memory snapshot with those on disk to form a set of values that satisfies the indicated projection. The committed values contained in the snapshot may override values retrieved from a storage device. In some embodiments, multiple in-memory snapshots may correspond to a single item. The snapshots may be identified by version number or other indication of a version. The most recent entry for a given value may be used to form the projection. In some embodiments, the snapshots may be marked with a version number to allow previous states of an item to be reconstructed.

Figure 6:
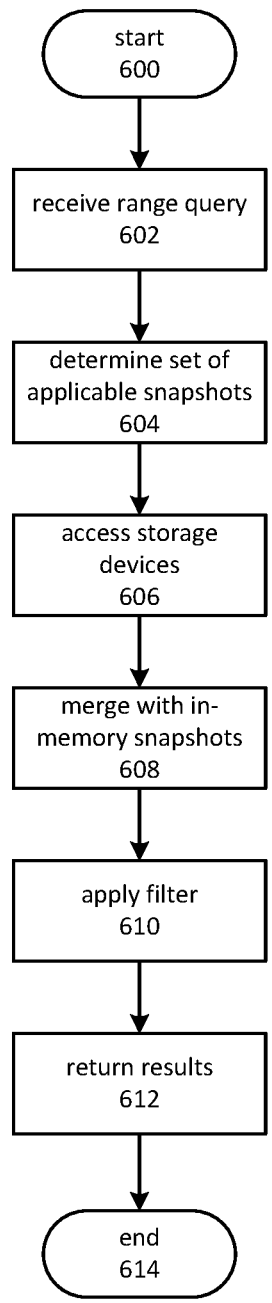
FIG. 6 is a flowchart depicting an embodiment for processing a request to perform a range query inclusive of one or more items having committed updates not yet written to one or more storage devices.

Embodiments may utilize in-memory snapshots in conjunction with range queries. FIG. 6 depicts an embodiment for providing consistent results for a range query performed over a secondary index. As described herein, consistency involves potential variations in query results that may occur based on a delay in propagating committed write operations to one or more storage devices. FIG. 6 is intended to be illustrative of generalized concepts which may be utilized in various combinations to form further embodiments. Those of ordinary skill in the art will recognize that the depicted operations, beginning at operation 600 and ending at operation 614, may be altered, omitted, reordered or performed in parallel.

Operation 602 involves receiving a request to perform an operation that includes a range query. For example, a secondary index may utilize a composite secondary key comprised of two values such as zip code and last name. A range query might specify a zip code as input and as output receive a list of all last names corresponding to that zip code.

A set of in-memory snapshots, corresponding to those implicated by the range query, may be determined as depicted by operation 604. In various embodiments, snapshots may exist only for those items that have recently been modified. Accordingly, the set of in-memory snapshots may comprise only a subset of the full set of items implicated by the range query. Operation 606 comprises accessing, retrieving or otherwise determining an applicable set of items on the one or more storage devices that should be merged with the snapshot data. In some embodiments, operation 606 may comprise scanning or otherwise accessing one or more secondary indexes. In some embodiments, operation 606 may also comprise selecting a strategy for traversing a secondary index while performing other operations, such as operations 608 and 610, in parallel.

A range query may involve one or more filters that may be applied to limit the results of the query to items having values within a specified range, are not null and so forth. When accessing items from the one or more storage devices, some embodiments may disregard any filters while performing operation 606. Embodiments may, for example, retrieve all potentially relevant items from storage, regardless of whether or not the item might be excludable on the basis of a filter. Because the in-memory snapshots may have modified the values contained by the storage devices, applying the filter could result in rows being incorrectly excluded. For example, assume an item contains a value representative of a telephone area code. A recently updated item may have a value of "425" on a storage device but have "206" in a snapshot. If items on the storage devices are selected based on a filter that restricts results to the "206" area code, the recently updated item would be excluded.

Embodiments may partially apply filters while selecting items from the storage devices. One approach involves determining which aspects of a filter might be affected by changes reflected by the snapshots, and selectively removing those aspects of the filter while applying others. Boolean logic may be a factor in determining which filters might still be applied. For example, a filter criterion might be described as either affected or unaffected by changes reflected by in-memory snapshots. If an unaffected criterion is joined with an affected criterion by an "AND" operator, the filter may be partially applied by applying the unaffected criteria to the items on the storage devices. On the other hand, if the unaffected and affected criterions were joined by an "OR" operator, applying the unaffected criterion to the items on the storage device could produce inaccurate results.

Operation 608 depicts merging in-memory snapshot data with the data from one or more storage devices. Merging involves overriding values from the storage devices with committed values from the snapshot. Embodiments may construct in-memory records of items in their committed state, which may be accessed by subsequent operations.

Once the committed states of modified items are available, filtering operations may be applied as depicted by operation 610. As explained previously, changes reflected by the snapshots may influence the application of the filtering operation, and may result in items being inadvertently excluded or included in the results of the range query. However, filters may be applied to an item in its committed state without affecting consistency. Embodiments may access in-memory records constructed in operation 608 for this purpose.

Operation 612 depicts returning results of the range query. In order to satisfy the projection required for the query, it may be necessary to access the item store to retrieve values not contained in a secondary index.

Figure 7:
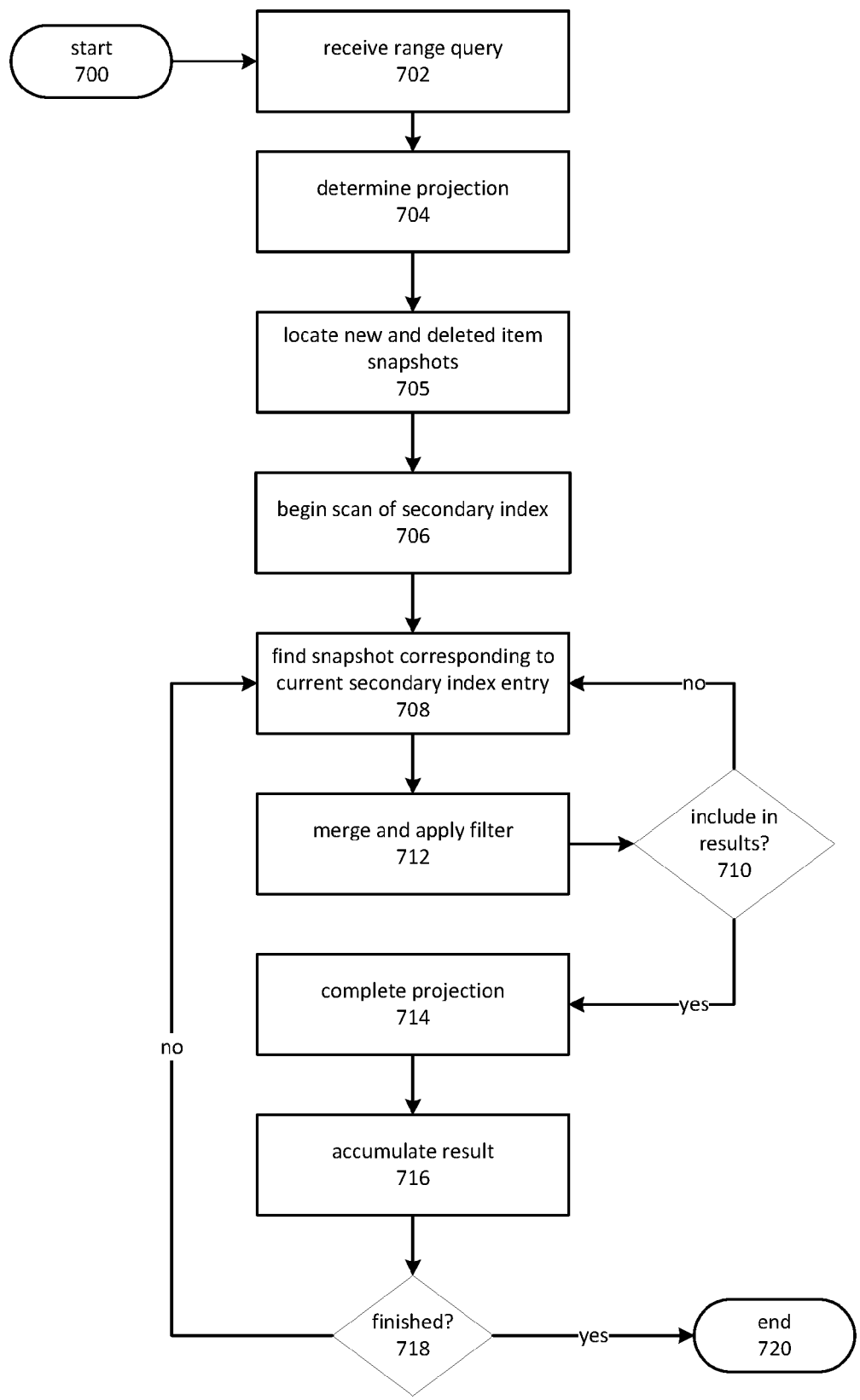
FIG. 7 is a flowchart depicting a further embodiment for processing a request to perform a range query inclusive of one or more items having committed updates not yet written to one or more storage devices.

FIG. 7 depicts a further embodiment for performing a range query. It is intended to be illustrative of generalized concepts which may be combined with other aspects of the present disclosure, such as the operations depicted in FIG. 6, to form further embodiments. Those of ordinary skill in the art will recognize that the depicted operations, which begin with operation 700 and end with operation 720, may be altered, omitted, reordered or performed in parallel.

Operation 700 depicts receiving a range query. Operation 702 depicts analyzing the query to determine the projection it implies. As explained previously, a projection may be defined as the set of values, or columns, that should be included for each item returned in the results. Operation 704 depicts determining a projection for the range query. The projection is indicative of columns or values for items that will be returned as a result of processing the range query.

Operation 705 depicts locating in-memory snapshots that correspond to items that have been inserted or deleted, but whose committed state has not yet been propagated to a storage device. New items whose state has been committed but not yet written to disk may be reflected by snapshots stored in memory. The in-memory snapshot corresponding to a new item may be included in the result set, provided that the range query does not specify filter criteria that excludes it. The committed state of deleted items may also be reflected by an in-memory snapshot. In this case, the snapshot may comprise an indication of the corresponding item's primary key, or other means of identifying the item. It may also comprise an indication of the corresponding item's deleted state.

A range query producing results consistent with committed changes not yet written to storage may be performed by scanning the secondary index and merging corresponding snapshot data. The scan may be initiated as depicted by operation 706. Scanning the secondary index may comprise evaluating a series of entries in the index. The scan may be a full scan of the index or it may be a partial scan limited by various constraints imposed by the range query but not potentially affected by uncommitted changes. During the scan, items may be skipped if there is a corresponding in-memory snapshot indicating that the item has been deleted.

For each entry evaluated during the scan of the secondary index, any corresponding snapshot records can be located, as depicted by operation 708. Some entries may not have any committed but unwritten changes and therefore have no corresponding snapshot records.

Operation 712 depicts merging the items contained in the secondary index to form an image of the committed item and applying any applicable filters. The image may be a partial item because the set of values contained in the secondary index and the snapshot may not comprise all of the values associated with the item. Any applicable filters may be applied to the partial item to determine whether or not it should be included in the result set, as depicted by operation 710. If not, processing of the range query may continue for the next entry in the secondary index, at operation 708. If so, processing of the range query may continue to operation 714.

The required projection may be assembled as depicted by operation 714. The item may contain values needed for the projection but not included in either the secondary index or any of the corresponding snapshots. Accordingly, completing the projection may require accessing the item store to retrieve the additional values. Embodiments may access the corresponding item in the item store by utilizing a primary key value in conjunction with a primary index. A copy of the primary key value may be retained within entries in the secondary index. Other embodiments may maintain location information within the secondary index that may be used to locate the item in the item store without reference to the primary index.

Operation 716 depicts accumulating the results. A set of values for each item, conforming with the desired projection, may be stored in a buffer or other data structure in preparation for returning the result set to the entity that invoked the range query. At 718, control may proceed again to operation 708 to begin evaluating the next entry in the secondary index. If all applicable records in the secondary index have been examined, the process may end and the completed result set may be returned. In some embodiments, partial result sets may be returned before all of the entries in the secondary index have been examined.

Figure 8:
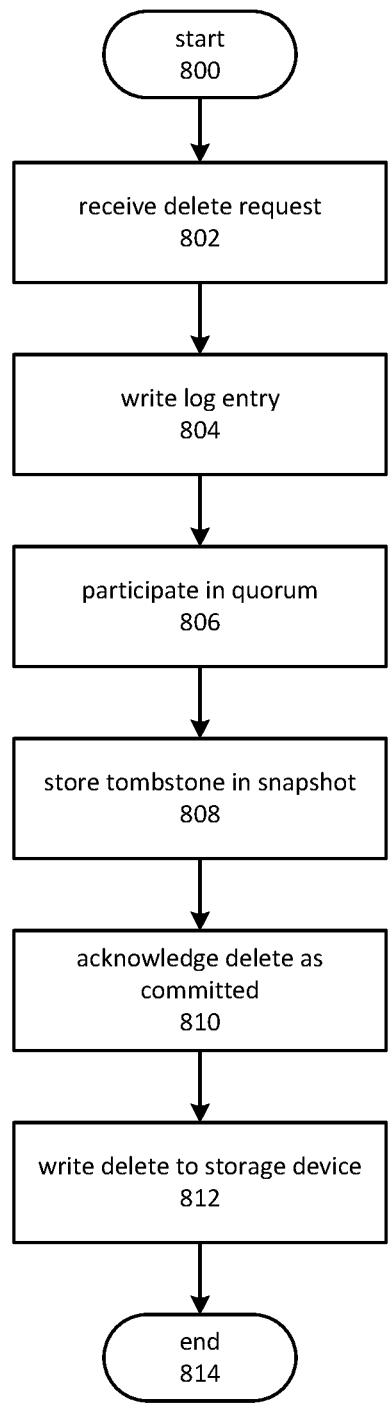
FIG. 8 is a flowchart depicting an embodiment for processing a request to delete an item that acknowledges success of the operation upon updating an in-memory snapshot data structure and before propagating the delete to one or more storage devices.

The result of a range query may also be affected by items that have committed but unwritten deletes. The committed state of deleted items may be reflected in an in-memory snapshot. FIG. 8 depicts a process, starting with operation 800 and ending with operation 814, for deleting an item using an in-memory snapshot. Operation 802 depicts a request to perform a delete operation, which when complete will result in the removal of one or more items or corresponding entries from the item store, primary index, and secondary indexes. A record of the request may be stored in a log file, as depicted by operation 804, which allows the request to be considered durable. Operation 806 depicts participating in quorum. As explained herein, quorum involves achieving a threshold level of participation by other computing nodes on which distributed data is stored. As with other request types, quorum participation for the delete may comprise requesting the participation of other computing nodes and detecting that the threshold level of computing nodes has made the delete operation durable.

At operation 808, a record of the deleted item is recorded in a snapshot data structure. Any in-memory indexes, hash tables, skip lists and so forth are also updated to refer to the new snapshot. If more than one item is to be deleted, multiple entries are recorded. As with other snapshots, embodiments may add the snapshot to a list of snapshots corresponding to the item. The list, which may comprise a wide variety of underlying data structures, may be maintained in order, or the snapshots may comprise a version number.

Embodiments may employ versioning for various purposes. Versioning may be employed in a multiversion concurrency control scheme to cope with concurrent reads and writes. Versioning may also be used to implement a snapshot isolation level. Snapshot isolation involves ensuring that all reads made in a transaction return consistent with a snapshot of values taken at the start of the transaction. However, various embodiments may opt to use less stringent isolation levels.

Embodiments may also employ versioning to improve the efficiency of propagating updates to storage devices. If snapshots applicable to a particular item are held in memory, they may be employed to collapse multiple updates into a smaller number of storage device write operations. For example, assume that multiple snapshots are held in memory for a particular item, the most recently versioned snapshot corresponding to a delete. Instead of propagating each of these changes to storage as separate operations, they may be collapsed into a single delete operation.

Returning to FIG. 8, the snapshot recorded at operation 808 may be described as a tombstone for the corresponding item. A tombstone, as used herein, is a compound or single-value data structure that indicates that the item has been deleted. When performing range queries, if an item is marked with a tombstone it may be excluded from the result set. Some embodiments may return previous values along with an indication that the item has been deleted.

Operation 810 depicts acknowledging that the delete operation has entered the committed state. The delete can then be propagated, as depicted by operation 812, to various structures maintained on one or more storage devices, such as a primary index, secondary indexes and an item store.

The committed state of items added to the system may also be reflected by an in-memory snapshot. A request to perform a put operation may apply to a new item that has not yet been added to the system. Processing of the put request may be performed by an embodiment such as the one depicted in FIG. 3. If FIG. 3 is assumed to apply to a new item, the primary index, secondary indexes and item store would not yet have any corresponding entries when success of the put request is acknowledged at operation 314.

Processing of a read request may proceed similar to the embodiment depicted in FIG. 5. However, because no corresponding entries will exist in the primary index, secondary indexes and item store, no merge operation is needed to complete the projection. The same is true of the range query embodiments depicted in FIGS. 6 and 7, insofar as the new items are concerned. To allow new items to be distinguished from modified items, in-memory snapshots corresponding to new items may be so marked. Embodiments may skip operations that would require accessing the item store or a secondary index to retrieve values needed to merge, apply filters or complete a projection. For example, operation 604 involves determining a set of snapshots applicable to a range query. Because a snapshot for a new item contains a complete set of values, it can be included or excluded from the set of applicable snapshots based on the values stored in the snapshot, without referencing the item store or a secondary index.

In-memory snapshots may also be used to detect concurrency control violations. A concurrency control violation may occur when concurrent or approximately concurrent changes are made to data maintained by the DBMS, and the changes conflict with each other. For example, an item's values might be set by two different processes in overlapping fashion, potentially resulting in the item being placed in an inconsistent or illogical condition. The in-memory snapshots for that item may be examined to determine if they conflict with newly issued requests to change the same data.

Embodiments of the present disclosure may be employed in conjunction with many types of DBMSs. A DBMS is a software and hardware system for maintaining an organized collection of data. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

Figure 9:
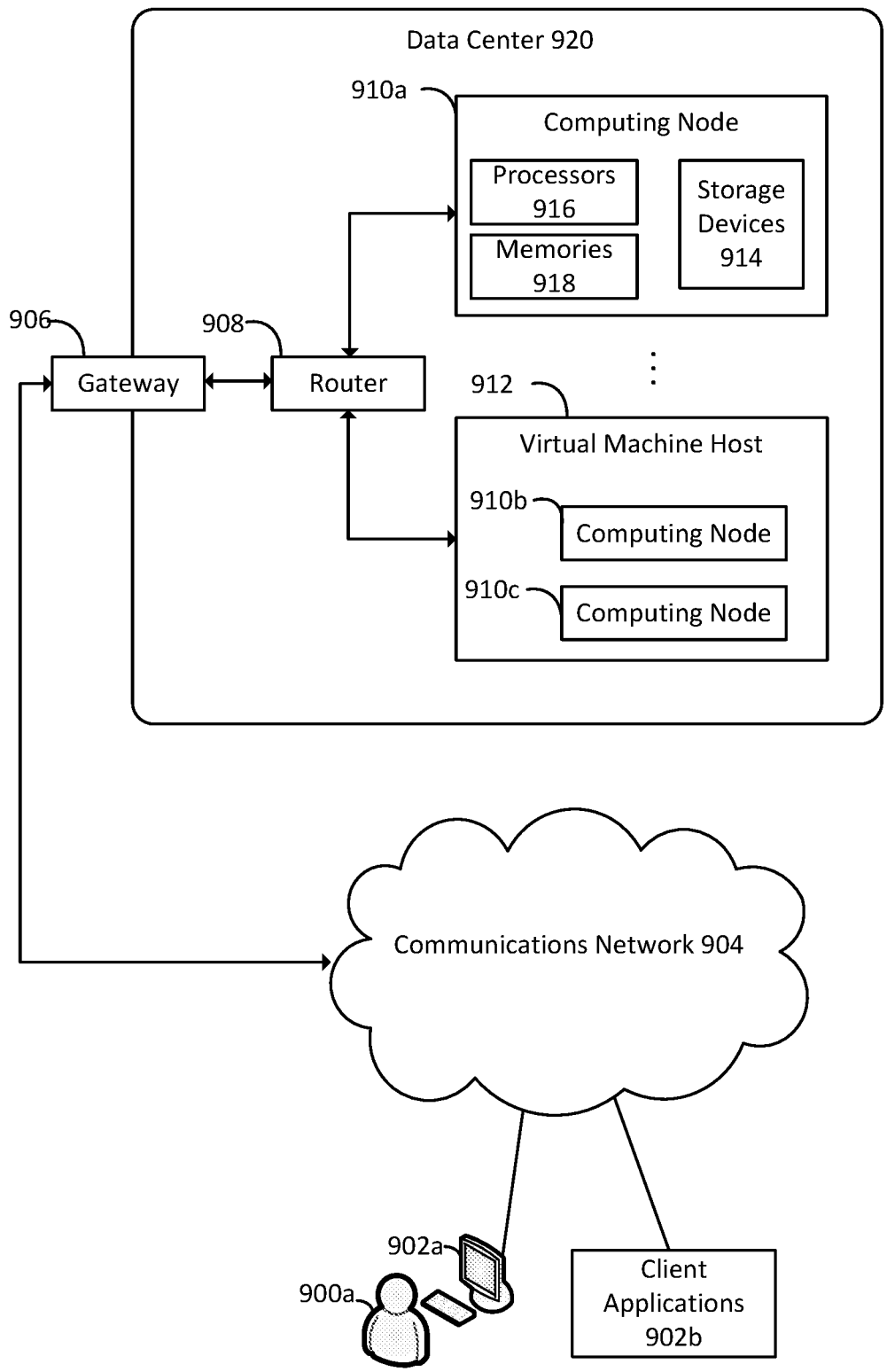
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 804 with processes executing on various computing nodes 910a, 910b and 910c within a data center 920. Alternatively, client applications 902b may communicate without user intervention. Communications network 904 may comprise any combination of communications technology, including the Internet, wired and wireless local area networks, fiber optic networks, satellite communications and so forth. Any number of networking protocols may be employed.

Communication with processes executing on the computing nodes 910a, 910b and 910c, operating within data center 920, may be provided via gateway 906 and router 908. Numerous other network configurations may also be employed. Although not explicitly depicted in FIG. 9, various authentication mechanisms, web service layers, business objects or other intermediate layers may be provided to mediate communication with the processes executing on computing nodes 910a, 910b and 910c. Some of these intermediate layers may themselves comprise processes executing on one or more of the computing nodes. Computing nodes 910a, 910b and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918 and one or more storage devices 914. Processes on computing node 910a may execute in conjunction with an operating system or alternatively may execute as a bare-metal process that directly interacts with physical resources such as processors 916, memories 918 or storage devices 914.

Computing nodes 910b and 910c are depicted as operating on virtual machine host 912, which may provide shared access to various physical resources such as physical processors, memory and storage devices. Any number of virtualization mechanisms might be employed to host the computing nodes.

The various computing nodes depicted in FIG. 9 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state storage, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database system, comprising:
 a computing node comprising one or more storage devices storing a collection of items; and
 memory coupled to one or more processors and storing program instructions that when executed on the one or more processors cause the system to:
  receive a request to perform a database query comprising criteria corresponding to at least one item in the collection of items and information indicative of a projection;
  read a first value corresponding to a portion of the at least one item stored in a first data structure on the computing node;
  read a second value corresponding to the portion of the at least one item from a second data structure on the computing node; and return, in response to the request, a view of the at least one item, including the projection and the second value, in response to determining that the second value:
conforms to the criteria,
supersedes the first value, and
is considered durable by a threshold number of computing nodes.

2. The system of claim 1, further comprising:
one or more additional computing nodes that, in combination with the computing node, form a plurality of computing nodes configured to operate a distributed database management system; and
wherein when executed on the one or more processors the program instructions further cause the system to:
update the at least one item in the collection of items with the second value, wherein to update the at least one item the system is configured to:
write an entry in a log file;
determine that the update to the at least one item is treatable as committed based at least in part on a threshold number of the plurality of computing nodes having written information indicative of the update to the at least one item to a log.

3. The system of claim 2, wherein when executed on the one or more processors the program instructions further cause the system to:
write updates corresponding to the update to the at least one item subsequent to the read of the first value.

4. The system of claim 1, wherein when executed on the one or more processors the program instructions further cause the system to:
read an indication of a deleted state of the at least one item from a third data structure on the computing node; and
determine not to return the view of the at least one item based at least in part on the indication of the deleted state of the at least one item.

5. A method, comprising:
performing a database query comprising criteria corresponding to at least one item in a collection of items, the performing of the database query comprising;
reading a first value corresponding to a portion of the at least one item stored in a first data structure on one or more storage devices;
reading a second value corresponding to the portion of the at least one item from a second data structure; and
generating a view of the at least one item, including the projection and the second value, in response to determining that the second value:
conforms to the criteria,
supersedes the first value, and
is considered durable by a threshold number of computing nodes.

6. The method of claim 5, further comprising:
updating the at least one item prior to performing the database query, comprising writing an entry in a log file corresponding to the updating of the at least one item.

7. The method of claim 6, the updating of the at least one item further comprising:
determining that a threshold number of additional computing nodes have participated in the updating of the at least one item.

8. The method of claim 6, further comprising:
writing updates to the one or more storage devices corresponding to the updating of the at least one item subsequent to performing the database query.

9. The method of claim 5, wherein the first data structure is a secondary index.

10. The method of claim 5, wherein the second data structure is a snapshot indicative of a committed state of the at least one item.

11. The method of claim 5, wherein the second data structure comprises a complete representation of a state of the at least one item.

12. The method of claim 5, further comprising:
completing a projection of the at least one item by accessing a record on the one or more storage devices, the record corresponding to the at least one item.

13. The method of claim 5, further comprising:
reading an indication of a deleted state of the at least one item from a third data structure; and
determining not to generate the view of the at least one item base at least in part on the indication of the deleted state of the at least one item.

14. A non-transitory, computer-readable storage medium, storing program instructions that when executed by one or more computing devices implement:
performing a database query comprising criteria corresponding to at least one item in a collection of items, the performing of the database query comprising;
reading a first value corresponding to a portion of the at least one item stored in a first data structure on one or more storage devices;
reading a second value corresponding to the portion of the at least one item from a second data structure; and
generating a view of the at least one item, including the projection and the second value, in response to determining that the second value:
conforms to the criteria,
supersedes the first value, and
is considered durable by a threshold number of computing nodes.

15. The non-transitory, computer-readable storage medium of claim 14, wherein the second data structure is a snapshot indicative of a committed state of the at least one item.

16. The non-transitory, computer-readable storage medium of claim 14, wherein the second data structure comprises a complete representation of a state of the at least one item.

17. The non-transitory, computer-readable storage medium of claim 14, wherein the program instructions when executed further implement:
determining not to generate the view of the at least one item when a third data structure stored in the memory is indicative of a deleted state of the at least one item.

18. The non-transitory, computer-readable storage medium of claim 14, wherein the program instructions when executed further implement:
completing a projection of the at least one item by accessing a record on the one or more storage devices corresponding to the at least one item.

19. The non-transitory, computer-readable storage medium of claim 14, wherein the program instructions when executed further implement:
updating the at least one item prior to performing the database query, comprising writing an entry in a log file corresponding to the updating of the at least one item.

20. The non-transitory, computer-readable storage medium of claim 14, wherein the program instructions when executed further implement:

writing updates to the one or more storage devices corresponding to the updating of the at least one item subsequent to performing the database query.

* * * * *